Patented Feb. 26, 1952

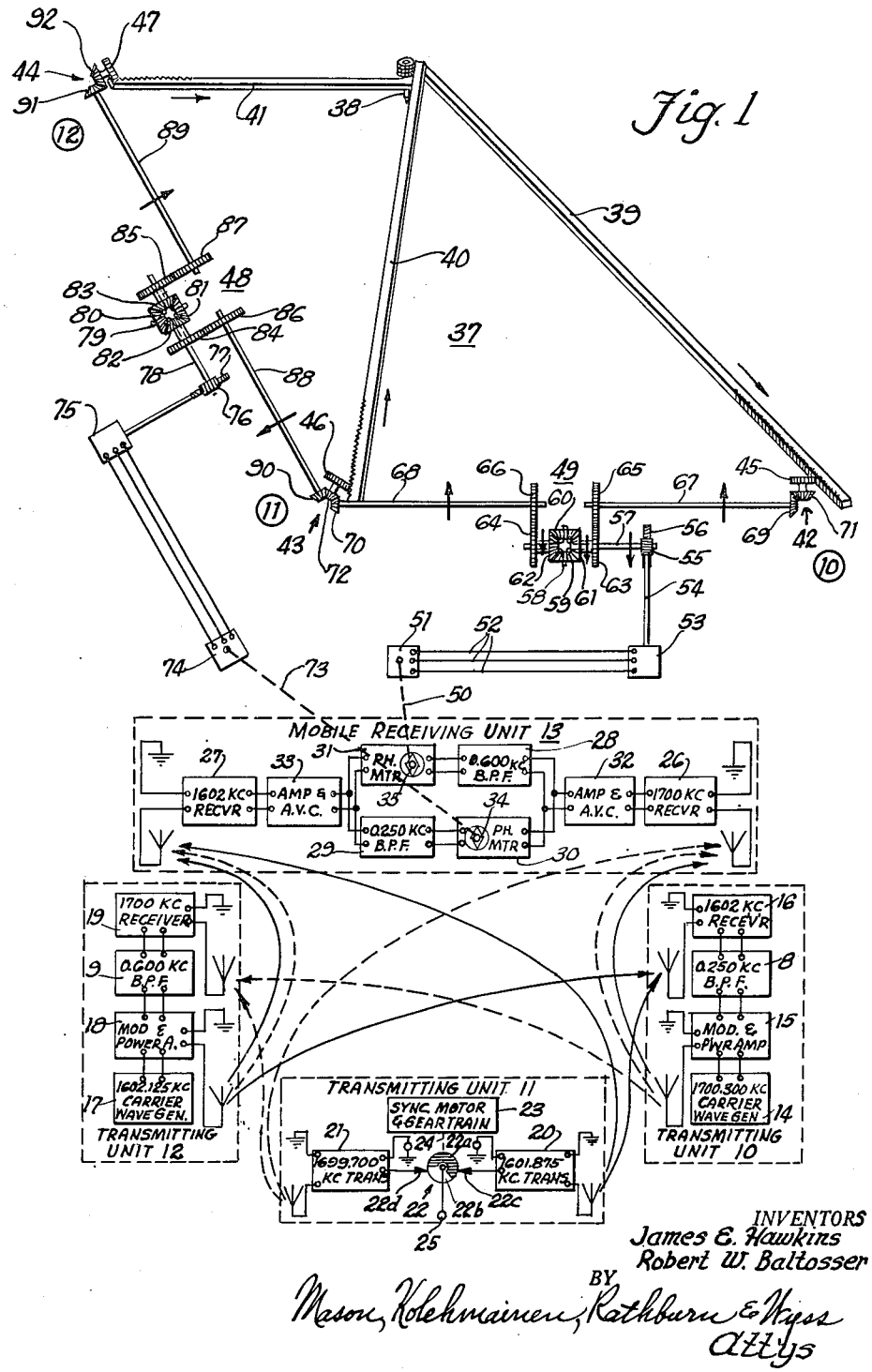

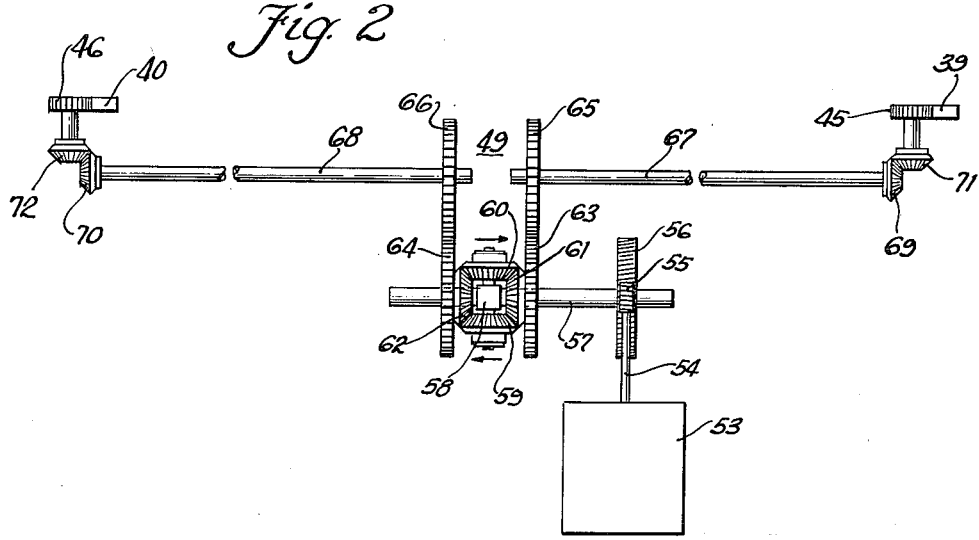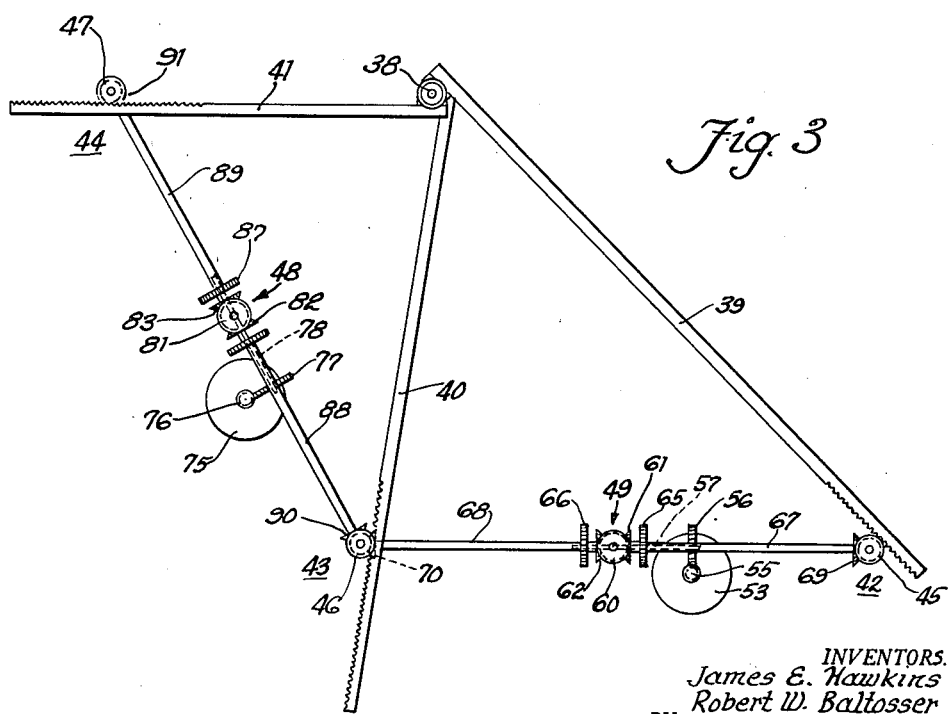

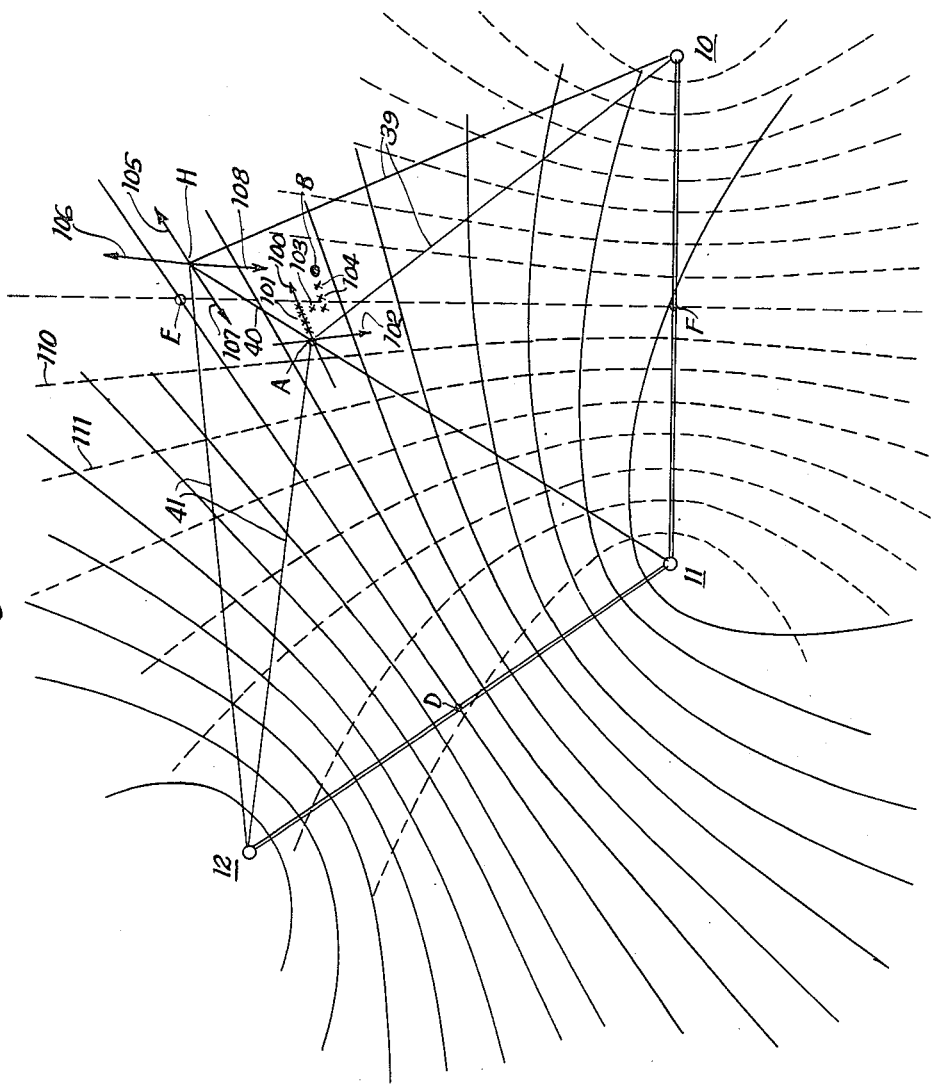

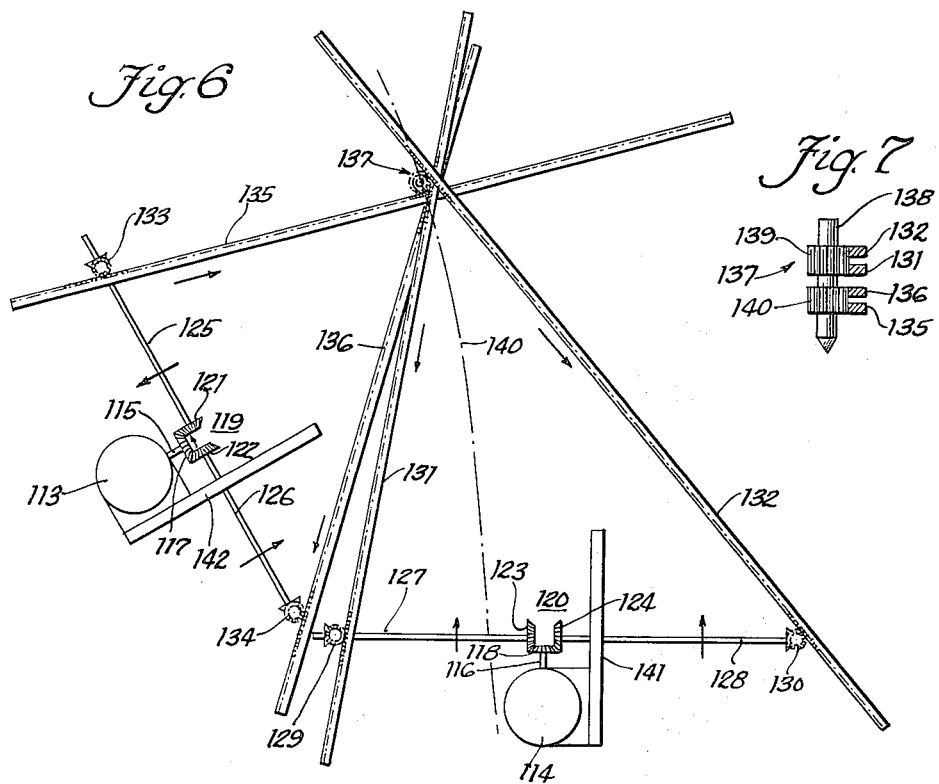
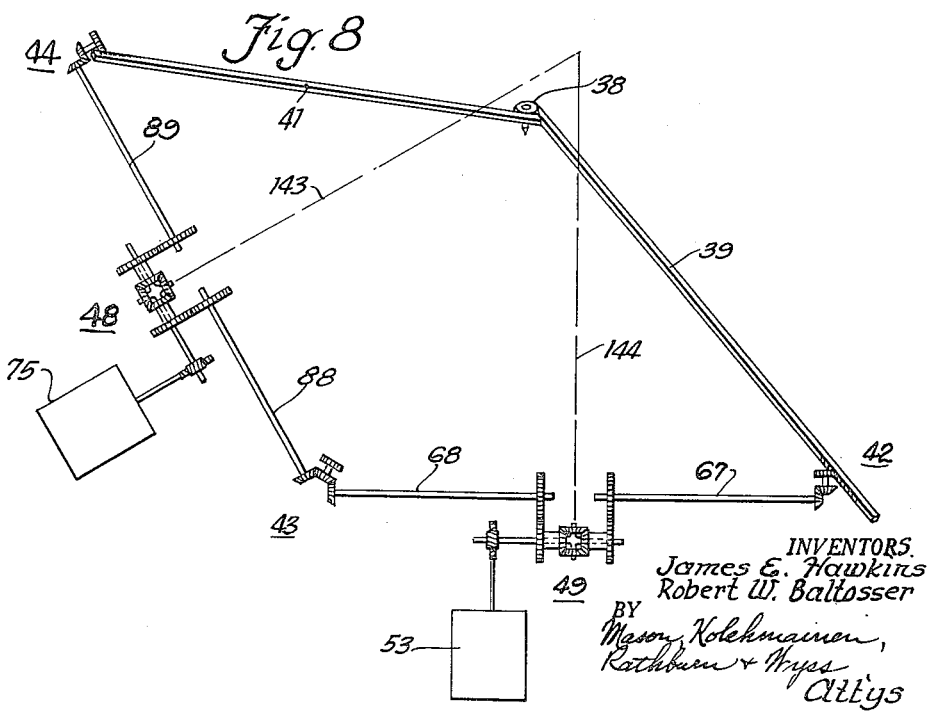

2,587,467

UNITED STATES PATENT OFFICE 2,587,467

POSITION PLOTTER FOR HYPERBOLIC RADIO SURVEY SYSTEM

James E. Hawkins and Robert W. Baltosser, Tulsa, Okla., assignors to Seismograph Service Corporation, Tulsa, Okla., a corporation of Delaware Application July 19, 1949, Serial No. 105,582

24 Claims. (Cl. 343—112)

The present invention relates to position computing and plotting apparatus and more particularly to improvements in signal receiving and position computing apparatus for use in radio position finding systems of the hyperbolic continuous wave type employing phase comparison in pairs of position indication signals radiated from at least three spaced transmitting points to provide indications or measures from which the position of a mobile receiving point relative to the known positions of the transmitting points are mechanically and automatically computed so as to provide a continuous position indication on a chart or the like.

In systems of the particular type referred to, the continuous waves radiated from each pair of transmitters produce standing waves in space, the phase relationship of which changes as a function of changing position between the two transmitting points. More specifically, the standing waves produced by each pair of transmitting units of the system are characterized by iso-phase lines which are hyperbolic in contour about the transmitting points as foci. On a line bisecting the pair of transmitters, these iso-phase lines are spaced apart a distance equal to one-half the mean wavelength of the radiated waves and have diverging spacings at points on either side of this line. With this system arrangement, the position of a receiving point relative to a pair of hyperbolic iso-phase lines may be determined by measuring the phase relationship between continuous waves radiated from the pair of transmitters. Since the point of location of the receiving point along the zone separating the two iso-phase lines is not indicated by such a phase measurement, it becomes necessary to employ at least three spaced transmitters, different pairs of which function to provide a grid-like pattern of intersecting hyperbolic lines, in order to obtain absolute determination of the position of the receiving point.

In systems of the continuous wave hyperbolic type heretofore proposed pairs of phase comparison means including indicator members have been employed to provide two visual indications which respectively reflect the position of the receiving point relative to the two sets of hyperbolic iso-phase lines, and the geographic position of the receiving point relative to the known positions of the transmitters may be manually located on specially prepared hyperbolic grid-type charts or maps. Such operations, however, are time consuming and require accurate counting by the observer or operator of the iso-phase lines or lanes on the chart in order to insure proper determination of the map position of the receiving apparatus. Moreover the preparation of the grid-type charts requires the exercise of great care and accuracy, and it is accordingly an object of the present invention to provide a mechanical computing apparatus which is capable either of accurately plotting a hyperbolic grid or chart consisting of two families of hyperbolic curves having one common focal point or of accurately tracing or continuously indicating on a map or chart (either with or without a hyperbolic grid pattern) the position of the receiving apparatus as reflected by the movement of the movable members of the phase comparison means.

It is another object of the invention to provide improved mechanical computing and plotting apparatus for generating hyperbolic curves of at least two intersecting families to form a hyperbolic intersection grid.

It is still another object of the invention to provide improved receiving and mechanical position computing or tracing apparatus which is uniquely adapted for use in position determining systems of the character described.

It is a further object of the invention to provide improved radio position finding systems of the hyperbolic continuous wave type incorporating receiving apparatus including computing and tracing mechanism capable of continuously indicating the position of the receiving apparatus relative to a plurality of known positions which constitute the focal points of a hyperbolic intersection grid.

Receiving and position computing and tracing apparatus embodying the present invention is highly useful in various types of radio position finding systems such, for example, as systems of the type disclosed in the Honore Patent No. 2,148,617 in which the carrier waves of each pair of transmitters are heterodyned at a fixed link transmitting point, and the difference frequency components of the heterodyned waves are modulated as reference signals upon the carrier output of the link transmitter or transmitters for radiation to the receiving point, where the difference frequency components are detected and respectively phase compared with the corresponding difference frequency signals derived by directly heterodyning the corresponding pairs of transmitted continuous waves at the receiving point. Moreover, apparatus embodying the invention is particularly applicable to and is herein described as embodied in improved radio position finding systems of the type described and broadly claimed in copending applications Serial No. 778,796 filed October 9, 1947, Patent No. 2,513,317 granted July 4, 1950, in the name of James E. Hawkins and Robert S. Finn, and Serial No. 42,648 filed August 5, 1948, Patent No. 2,513,318 granted July 4, 1950 in the name of James E. Hawkins and Beverly W. Koeppel, which applications are assigned to the same assignee as the present invention.

In the systems disclosed in the said copending applications the number of frequency channels required is minimized by so arranging the system that two of the three transmitting units forming a complete system are alternately employed to radiate the required position indicating and reference signals. More specifically, the two combination position indicating and reference signal transmitters function to radiate pure unmodulated carrier wave energy when operating as position indicating signal transmitters and to radiate the same carriers modulated with reference signals when operating as reference signal transmitters and the two receivers at the receiving station alternately receive the two types of signals to produce equal frequency signals for phase comparison. In order to minimize errors of position indications due to minor frequency changes and amplitude variations in the signals to be compared, means are provided in the receiving equipment disclosed in application Serial No. 42,648 for maintaining amplitude equality of the signals to be phase compared and for compensating for phase shifts introduced into the phase comparing circuit by changes in the frequency of the signals. The receiving and phase comparing apparatus, which is preferably of the type disclosed and claimed in a copending application Serial No. 100,382 filed June 21, 1949, Patent No. 2,551,211 granted May 1, 1951 in the name of James E. Hawkins and Beverly W. Koeppel, includes a pair of rotatable members which are alternately driven to positions indicative of the position of the receiving apparatus relative to the known positions of the alternately cooperating transmitting points and in accordance with the present invention the respective movements of the rotatable members are employed to operate a computing and tracing mechanism so as continuously to indicate on a map or chart the exact position of the receiving apparatus.

The invention, both as to its organization and method of operation, together with further objects and advantages thereof, will best be understood by reference to the specification taken in connection with the accompanying drawings, in which:

Fig. 1 is a diagrammatic illustration of an improved radio position determining system including receiving and position computing or tracing apparatus embodying the present invention;

Fig. 2 is an elevational view on a somewhat larger scale of a portion of the computing and tracing apparatus shown in Fig. 1;

Fig. 3 is a plan view of the computing and tracing apparatus shown in Figs. 1 and 2;

Fig. 4 is an enlarged detail view of the tracing element employed in the position computing and tracing apparatus;

Fig. 5 is a diagrammatic view showing an intersecting hyperbolic grid which may be produced by or which may be employed with the computing and tracing apparatus;

Fig. 6 is a plan view similar to Fig. 3 showing a modified form of position computing and tracing apparatus embodying the invention;

Fig. 7 is a detail view of the tracing element employed in the apparatus of Fig. 6; and Fig. 8 is a diagrammatic view similar to the upper portion of Fig. 1 but illustrating a still further embodiment of the invention which may be employed under special conditions.

Referring now to the drawings and more particularly to Figs. 1 to 5, inclusive, the present invention is illustrated as embodied in a system for providing position information at a mobile receiving unit 13 which may be carried by a vessel or vehicle operating within the radius of transmission of three spaced transmitting units 10, 11, and 12. These units are preferably spaced apart approximately equal distances and are so positioned that the line bisecting the points of location of the units 10 and 11 is angularly related to the line bisecting the points of location of the units 11 and 12 as diagrammatically indicated in Fig. 5. As described more fully below, the transmitting units 10 and 12 are equipped continuously to radiate position indicating signals in the form of carrier waves of different frequencies, whereas the transmitting unit 11 is equipped alternately to radiate two additional position indicating signals in the form of carrier waves of still different frequencies. Specifically, the transmitter embodied in the unit 10 comprises a carrier wave generator or oscillator 14 and a modulator and power amplifier unit 15. Similarly, the transmitter embodied in the transmitting unit 12 comprises a carrier wave oscillator or generator 17 and a modulator and power amplifier unit 18. The transmitting unit 11 comprises two transmitters 20 and 21 for respectively radiating position indicating carrier waves at two different carrier frequencies, together with switching means for alternately rendering these two transmitters operative. In order to illustrate the action which occurs, arrow pointed solid lines have been shown in Fig. 1 of the drawings to indicate the receiving points of signal acceptance and the sources of the accepted signals during each period when the transmitter 20 is operating, and arrow pointed dashed lines have been shown to illustrate the receiving points of signal acceptance and the sources of accepted signals during each period when the transmitter 21 is operating. From a consideration of these lines and reflection upon the above explanation, it will be understood that the receivers 26 and 27 (to be more fully described hereinafter) alternately function as reference signal detecting receivers and as heterodyning receivers for developing the required heterodyne or difference frequency signals. In the arrangement illustrated, keying of the two transmitters 20 and 21 for alternate operation is accomplished by alternately feeding anode current to the electron discharge tubes of the respective transmitters from the positive terminal 25 of the anode current source, not shown, through a commutating ring 22 which is shaft connected by means of a shaft 24 to be driven at a constant speed by a synchronous motor and gear train unit 23. More specifically, the positive terminal 25 of the anode current source is connected to the conductive segment 22b of the commutating ring 22, which segment spans slightly less than half the circumference of the ring. The remainder of the ring is comprised of an insulating segment 22a. At diametrically opposed points around the circumference of the ring, brushes 22c and 22d are provided which engage the ring periphery. These brushes are respectively connected to the positive bus conductors of the two transmitters 20 and 21, such that anode current is alternately delivered to the electron discharge tubes of the two transmitters. Since the conductive segment 22b of the ring 22 represents slightly less than half the periphery surface of the ring, it will be understood that a short off-signal period is provided between successive periods during which the transmitters 20 and 21 are alternately operated, thus preventing simultaneous radiation of waves by both transmitters. The periodicity with which the two transmitters 20 and 21 are alternately operated is, of course, dependent upon the speed of rotation of the commutating ring 22. Preferably, this ring is driven at a speed of one revolution per second such that transmitters 20 and 21 are each rendered operative at one-half second intervals.

As indicated above, the carrier frequencies at which the four transmitters of the three transmitting units 10, 11 and 12 operate are all different. Preferably, however, these carrier waves are so paired that the frequencies of each pair are well within a single channel allocation of 10 kilocycles as specified by the Federal Communications Commission of the United States Government. To this end, the output frequency of the transmitter 20 and the output frequency of the transmitter in the unit 12, forming the first transmitter pair, may be 1601.875 and 1602.125 kilocycles respectively, such that the difference frequency therebetween is 0.250 kilocycle, while the output frequencies of the transmitter 21 and the transmitter of the unit 10, forming the second transmitter pair, may be 1699.700 and 1700.300 kilocycles, respectively, such that the difference frequency therebetween is 0.600 kilocycle. It will be noted that the channels in which the two pairs of carrier frequencies fall are separated in the frequency spectrum by approximately 100 kilocycles, thus facilitating selective reception of these carrier pairs in the manner more fully explained below. The power of the four transmitters is such that the entire area in which position information may be desired aboard the vehicle or vessel carrying the receiving unit 13 is blanketed with waves radiated from each of the four transmitters and that these waves have a field strength at all points within this area sufficient to permit reliable reception without requiring undue sensitivity of the receiving equipment.

The transmitting units 10 and 12 are respectively provided with means for alternately modulating the waves radiated by the transmitters of the units 10 and 12 with reference signals representative of the difference frequencies between the carrier wave pairs. These reference signals may be received at any receiving point, such, for example, as at the mobile receiving unit 13, located within the radius of transmission of the four transmitters. The equipment for this purpose as provided at the transmitting unit 10 comprises a fixed tuned amplitude modulation receiver 16, center tuned to a frequency of 1602 kilocycles and sharply selective to the 1601.875 and 1602.125 kilocycle carrier waves respectively radiated by the transmitter 20 and the transmitter of the unit 12. The selectivity of this receiver is obviously such that the carrier waves radiated by the transmitter 21 and the transmitter of the unit 10 are rejected in the radio frequency section thereof. The beat frequency of 0.250 kilocycle between the two carriers accepted by the radio frequency section of the receiver 16 is reproduced in the audio frequency section of this receiver and delivered to the modulator 15, for amplitude modulation upon the carrier output of the transmitter embodied in the unit 10, through a narrow band pass filter 8, which is center tuned to a frequency of 0.250 kilocycle. Similarly, the transmitting unit 12 is equipped with a fixed tuned amplitude modulation receiver 19 which is tuned to a carrier frequency of 1700 kilocycles and is sharply selective to the 1699.700 and 1700.300 kilocycle waves respectively radiated by the transmitter 21 and the transmitter of the unit 10. Here again, the selectivity of the receiver 19 is obviously such that the carrier waves radiated by the transmitter 20 and the transmitter of the unit 12 are rejected in the radio frequency section of the receiver. The beat frequency of 0.600 kilocycle between the two carrier waves accepted by the receiver 19 is reproduced in the audio frequency section thereof and modulated upon the carrier wave output of the transmitter embodied in the transmitting unit 12 through a narrow band pass filter 9 which is center tuned to a frequency of 0.600 kilocycle.

Referring now particularly to the equipment making up the mobile receiving unit 13 and the phase comparison and position computing apparatus associated therewith, it will be noted that this equipment comprises a pair of fixed tuned amplitude modulation receivers 26 and 27, the output circuits of which are respectively connected through suitable amplifier and automatic gain or volume control stages 32 and 33 to a pair of phase comparison devices or phase meters 30 and 31 and a pair of narrow band pass filters 28 and 29 center tuned to frequencies of 0.600 and 0.250 kilocycles. More specifically, the receiver 26 is fixed tuned to a carrier frequency of 1700 kilocycles and is designed to accept the carrier wave radiated by the transmitter 21 and the carrier wave radiated by the transmitter of the unit 10 both when modulated and unmodulated. Similarly, the receiver 27 is fixed tuned to a carrier frequency of 1602 kilocycles and is designed to accept the carrier wave radiated by the transmitter 20 and the carrier wave radiated by the transmitter of the unit 12 both when modulated and unmodulated.

The automatic gain control or AVC circuits associated with the amplifier stages 32 and 33 are of the variable impedance type known in the art and capable of functioning without introducing amplitude distortion or variable phase shift in the reference signals and the heterodyne or difference frequency signals developed at the output terminals of the receivers. Preferably the amplifier and AVC stages are of the type disclosed in a copending application of James E. Hawkins and Jesse R. Cornett, Serial No. 673,744 filed June 1, 1946, Patent No. 2,554,905 granted May 29, 1951, for Seismic Signal Amplifier and assigned to the same assignee as the present invention and each of these stages corresponds to the automatic gain control and amplifier stage identified by the reference number 13 in the said Hawkins and Cornett application.

The filters 28 and 29, which may be of any standard commercial construction, perform the function of selecting the heterodyne or difference frequency signals alternately developed at the output terminals of the receivers 26 and 27, respectively, and amplified in the stages 32 and 33 and delivering these signals to the phase meters 31 and 30, respectively.

As indicated in the above mentioned copending application Serial No. 42,648, the phase meters 30 and 31 may be of the general character disclosed in Morrison Patent No. 1,762,725, granted June 10, 1930, which are capable of measuring phase angles in excess of 360 electrical degrees between two impressed signal voltages and which include rotatable rotors or indicator members 34 and 35 respectively. Preferably, however, the phase meters 30 and 31 constitute null type motor driven phase discriminating and indicating apparatus of the type described and claimed in the above referred to copending application Serial No. 100,382. As there described, the rotatable members carry a pointer which indexes with a circular scale to indicate the phase relationship between the two impressed voltages. In accordance with the present invention, however, the rotatable members 34 and 35 are employed as hereinafter described to drive a computing and tracing mechanism so as to indicate continuously on a map or chart the position of the receiving unit 13.

Before describing in detail the construction and operation of the computing and tracing mechanism driven by the rotatable members 34 and 35 of the phase meters 30 and 31, the operation of the transmitting and receiving apparatus of the position determining system will be more fully explained.

It will be understood that when the motor and gear train unit 23 is operating to drive the commutating ring 22, anode current is alternately delivered to the electron discharge tubes of the transmitters 20 and 21, such that these of the transmitters are alternately rendered operative to radiate carrier waves at frequencies of 1601.875 and 1699.700 kilocycles, respectively. The transmitters of the units 10 and 12, on the other hand, operate continuously. Accordingly, during each interval when the transmitter 20 is in operation, the carrier waves of 1601.875 and 1602.125 kilocycles respectively radiated by the transmitter 20 and the transmitter of the unit 12 are picked up and heterodyned in the radio frequency sections of the receivers 16 and 27. In the receiver 16, the difference frequency signal of 0.250 kilocycle is reproduced in the audio section of the receiver, passed by the filter 8 and modulated upon the carrier wave output of the transmitter in the unit 10 for radiation as a reference signal. If desired an amplifier and automatic gain control stage similar to the stages 32 and 33 may be interposed in the output circuit of the receiver 16 in order to maintain constant modulation. This modulated carrier wave is received by the receiver 26 of the mobile receiving unit 13 and the 0.250 kilocycle modulation component is reproduced at the output terminals of this receiver. During the period indicated, the transmitter 21 is not in operation and hence no heterodyne or beat frequency signal is developed by the receiver 26. The 0.250 kilocycle reference signal as thus reproduced by the receiver 26 is amplified to the proper level in the amplifier and AVC stage 32 and applied to the right set of terminals of the phase meter 30 and also to the input terminals of the 0.600 kilocycles band pass filter 28. This filter rejects the applied signal and thus prevents the same from being applied to the right set of input terminals of the phase meter 31.

The 0.250 kilocycle beat frequency or heterodyne signal resulting from heterodyning of the carriers radiated by the transmitter 20 and the transmitter of the unit 12 in the radio frequency section of the receiver 27 is reproduced across the output terminals of this receiver and after amplification to the proper level in the amplifier and AVC stage 33 is applied to the left set of input terminals of the phase meter 31 and the input terminals of the 0.250 kilocycle band pass filter 29 in parallel. Since the filter 28 prevents a signal from being applied to filter 28 prevents a signal from being applied to the right set of input terminals of the phase meter 31, this phase meter does not respond to the signal voltage applied to its left set of input terminals by the receiver 27. The filter 29, however, passes the 0.250 kilocycle signal developed across the output terminals of the receiver 27 and applies the same to the left set of terminals of the phase meter 30. Thus two signal voltages of identical frequency are applied to the two sets of input terminals of the phase meter 30, with the result that this phase meter functions to rotate its indicator element 34 to a position which is accurately representative of the position of the receiving unit 13 between two iso-phase lines of the standing waves producted in space as a result of the carrier wave radiation by the transmitter 20 of the unit 11 and the transmitter of the unit 12. In Fig. 5, wherein the relative positions of the units 11 and 12 are diagrammatically illustrated, the family of hyperbolas shown in full lines and having the positions 11 and 12 as focal points, are representative of the isophase lines related to the transmission of waves from the transmitter 20 of the unit 11 and the transmitter of the unit 12.

At the end of the described transmitting interval, the commutating ring 22 functions to interrupt the circuit for delivering anode current to the tubes of the transmitter 20, with the result that carrier wave radiation from this transmitter is terminated. When radiation of this wave stops, the carrier heterodyning action of the two receivers 16 and 27 is likewise terminated to interrupt the reference signal radiation by the transmitter of the unit 10 and to interrupt the heterodyne or difference frequency signal being developed across the output terminals of the receiver 27. Thus the phase meter 30 is rendered ineffective further to change the setting of the rotatable member 34.

A short time interval after operation of the transmitter 20 is stopped, the commutating ring 22 functions to deliver anode current to the tubes of the transmitter 21 and thus initiate operation of this transmitter. With the transmitter 21 in operation, a 1699.700 kilocycle position indicating carrier wave is radiated thereby which is accepted by the receivers 19 and 26. More specifically, the receiver 19 functions to heterodyne the carrier wave radiated by the transmitter 21 with the carrier wave radiated by the transmitter of the unit 10 and to reproduce the heterodyne or difference frequency signal of 0.600 kilocycle in the audio frequency section thereof. This difference frequency or reference signal is passed by the filter 9, modulated upon the output carrier wave of the generator 17 in the modulator and power amplifier unit 18 and radiated as a modulation component upon the carrier wave transmitted by the transmitter of the unit 12 to the receiver 27. As previously mentioned in connection with the receiver 16 of unit 10, a suitable amplifier and automatic gain control stage may be interposed in the output circuit of the receiver 19 in order to maintain constant modulation. The receiver 27 accepts the modulated carrier wave and reproduces the modulation component thereof in the usual manner. The reference signal thus developed across the output terminals of the receiver 27 is amplified to the proper level in the amplifier and AVC stage 33 and applied across the left set of input terminals of the phase meter 31 and the input terminals of the band pass filter 29 in parallel. This filter functions to reject the applied reference signal voltage and thus prevents the same from being impressed upon the left set of terminals of the phase meter 30. It will be understood that the receiver 27 is incapable of accepting the carrier wave radiated by the transmitter of the unit 10. Hence this receiver is prevented from heterodyning the carrier wave radiated by the transmitter of the unit 10 with the carrier wave radiated by the transmitter of the unit 12.

The 1699.700 and 1700.300 kilocycle waves respectively radiated by the transmitter 21 and the transmitter of the unit 10 are both accepted by the receiver 26 and heterodyned in the radio frequency section thereof to produce a heterodyne or difference frequency signal which is produced across the output terminals of the receiver and after amplification to the proper level in the amplifier and AVC stage 32 is applied to the right set of input terminals of the phase meter 30 and the input terminals of the filter 28 in parallel. Since the filter 29 prevents a signal from being applied to the left set of input terminals of the phase meter 30, this phase meter does not respond to the signal voltage applied to its right set of terminals by the receiver 26. The 0.600 kilocycle reference signal applied to input terminals of the filter 28 is passed by this filter and applied to the right set of input terminals of the phase meter 31. Thus reference and heterodyne or difference frequency signals of identical frequencies are respectively applied to the two sets of input terminals of the phase meter 31 which functions to measure the phase relationship between the two applied signal voltages and rotate its indicator element 35 to a position accurately representative of the position of the receiving unit 13 between two iso-phase lines of the standing waves produced in space by the radiation of position indicating carrier waves from the transmitter 21 of the unit 11 and the transmitter at the unit 10. These iso-phase lines are represented in Fig. 5 by the family of hyperbolic curves shown in broken lines and having as focal points the positions 11 and 10.

At the end of the described transmitting interval, the commutating ring 22 functions to interrupt anode current flow to the tubes of the transmitter 21 and thus arrest operation of this transmitter. When carrier wave radiation by the transmitter 21 is thus terminated, the wave heterodyning action effected in the receivers 19 and 26 is instantly stopped to terminate the radiation of 0.600 kilocycle reference signal by the transmitter of the unit 12 and to terminate reproduction of the difference or heterodyne signal at the output terminals of the receiver 26. Thus the application of signal voltages to the two sets of input terminals of the phase meter 31 is interrupted, with the result that no further change in the setting of the indicating element 35 can be produced. A short time interval after operation of the transmitter 21 is arrested, the commutating ring 22 functions to recomplete the circuit for delivering anode current to the tubes of the transmitter 20 and thus reinitiate operation of this transmitter with the results described above.

From the foregoing explanation, it will be understood that the transmitters 20 and 21 in their alternate operation to radiate position indicating carrier waves cooperate with the receivers 16 and 19 of the transmitting units 10 and 12 alternately to render the transmitters of these units operative to radiate position indicating signals and reference signals. More in particular, the position indicating carrier waves alternately radiated by the transmitters 20 and 21 alternately cause the position indicating carrier waves respectively radiated by the transmitters of the units 10 and 12 to be modulated with reference signals during periods when these transmitters are respectively inactive as position indicating signal radiators. Specifically, the receiver 26 functions as a heterodyne receiver in respect to the position indicating carrier waves radiated by the transmitter 21 and the transmitter of the unit 10, and functions as a reference signal reproducing receiver in receiving the reference signal modulated carrier radiated by the transmitter of the unit 10. The receiver 27, on the other hand, functions as a heterodyne receiver in respect to the position indicating carrier waves radiated by the transmitter 20 and the transmitter of the unit 12 and as a reference signal detecting receiver in receiving the reference signal modulated carrier wave radiated by the transmitter of the unit 12.

As previously indicated, the alternate rotary movements of the rotatable members 34 and 35 of the phase meters 30 and 31 respectively constitute measures of the position of the mobile receiving unit 13 relative to two sets of iso-phase lines having focal points at the positions 12, 11 and 10, the position 11 being common to the two sets. In accordance with the present invention the rotatable members 34 and 35 are arranged to operate a computing and tracing mechanism 37 which, as shown in Figs. 1 to 4, inclusive, comprises a tracing member 38, the position of which is representative of the receiving unit 13 and which forms a common pivot for a plurality of extensible and retractable arm members 39, 40 and 41 which are respectively connected for longitudinal adjustment to suitable motion transmitting means 42, 43 and 44, the respective positions of which correspond to the locations of the transmitting units 10, 11 and 12. The tracing member 38 may be of any desired construction but is shown in Fig. 4 as comprising a pivot pin which extends through and is rotatably mounted in a plurality of extending ears 39a, 40a and 41a respectively carried by the arms 39, 40 and 41. It will, of course, be understood that if a permanent record of the movements of the tracing member 38 is desired, or if the mechanism is to be used to plot an intersection grid chart, the tracing member 38 may take the form of a marking member such as stylus or other suitable record producing member. The arm members and the associated motion transmitting means may likewise be of any suitable construction in which operation of the motion transmitting means is effective to adjust the length of the arms, and in the embodiment shown, the arms 39, 40 and 41 have been illustrated as rack members having suitable rack teeth thereon adapted to mesh with rack gears 45, 46 and 47 forming part of the motion transmitting means. The respective center lines of the rack gears 45, 46 and 47 constitute the focal points corresponding to the positions of the transmitter units 10, 11 and 12, and it will be noted that the arms 39, 40 and 41 are offset from the center lines a distance equal to the radius of the rack gears. The displacement error thus introduced, however, is compensated for by the ears 39a, 40a and 41a, which extend from the arms an equal distance and carry the tracing member 38.

Respectively disposed between the motion transmitting means 43 and 44 and between the motion transmitting means 42 and 43 are a pair of differential mechanisms 48 and 49 which are respectively arranged to be driven by the rotatable members 34 and 35 of the phase meters 30 and 31. Thus the rotatable member 35 is shaft connected as indicated by the broken line 50 to the rotor of a servo-generator 51 which is electrically connected as indicated by the conductors 52 to a servo-motor 53 which drives a shaft 54 carrying a worm 55 adapted to mesh with a worm gear 56 on the driving shaft 57 of the differential mechanism 49. The servo system comprising the servo-generator 51 and the servo-motor 53 may be of any well known type available in the art and it will, of course, be understood that if the phase meter 31 is of a type capable of developing sufficient torque to drive the differential 49 and the mechanism connected thereto, the servo system may be eliminated and the shaft of the phase meter may be connected directly to the differential through the worm 55 and the worm gear 56 which provide a unidirectional or irreversible driving connection.

Mounted on the shaft 57 of the differential is a spider 58 which carries a pair of spider pinions 59 and 60 arranged to mesh with a pair of oppositely disposed differential pinions 61 and 62 which are rotatably mounted on the shaft 57 and carry suitable spur gears 63 and 64 which respectively mesh with cooperating spur gears 65 and 66 secured to shafts 67 and 68 which extend to the respective motion transmitting means 42 and 43 and are provided with bevel gears 69 and 70 which are arranged to mesh with additional bevel gears 71 and 72 which form parts of the motion transmitting means and are respectively carried by the rack gears 45 and 46.

Similarly the phase meter 30 is shaft connected as indicated by the broken line 73 to a servo-generator 74 which is electrically connected to a servo-motor 75, the shaft of which carries a worm 76 meshing with a worm gear 77 on the driving shaft 78 of the differential mechanism 48. The differential mechanism 48, which is identical with the differential mechanism 49, includes a spider 79, a pair of spider mounted pinions 80 and 81, oppositely disposed differential pinions 82 and 83, and a pair of spur gears 84 and 85 arranged to mesh with the spur gears 86 and 87 which are respectively mounted on the drive shaft 88 and 89 extending to the motion transmitting means 43 and 44. As shown, the shaft 88 carries a bevel gear 90 which forms a part of the motion transmitting means 43 and is arranged to mesh with the bevel gear 72 in reverse relation relative to the bevel gear 70. Likewise the shaft 89 carries at its outer end a bevel gear 91 which forms a part of the motion transmitting means 44 and is arranged to mesh with a cooperating bevel gear 92 carried by the rack gear 47.

In order to carry out a position tracing operation it is, of course, necessary that the starting point of the mobile receiving unit 13 and consequently of the tracing member 38 be known. For purposes of description it will be assumed that the unit 13 is at the position represented by the letter A in Fig. 5 and that during the interval to be described it moves to the position B. During the first portion of the movement of the receiving unit it will be assumed that the transmitter at the unit 10 and the transmitter 21 at the unit 11 are operating as heretofore described to cause rotary movement of the measuring or indicating member 35 of the phase meter 31 in a direction such as to rotate the drive shaft 57 of the differential mechanism 49 in the direction indicated by the arrow in Fig. 1 immediately adjacent the shaft 57. Throughout the drawings the arrows shown adjacent the various rotating shafts and gears indicate the direction of movement of the top of the said shafts and gears.

The consequent rotation of the spider 58 carrying the spider pinions 59 and 60 will effect rotation of the differential pinions 61 and 62 and the spur gears 63 and 64 in the direction indicated by the arrows, which, through the gears 65 and 66, will drive the shafts 67 and 68 in the same direction as again indicated by arrows. It will be observed that the rack gear 45 of the motion transmitting means 42 engages the rack teeth on the inner side of the arm 39, while rack gear 46 at the motion transmitting means 43 engages the rack teeth on the outer side of the arm 40 and consequently the arms 39 and 40 will be driven in opposite directions again as indicated by arrows, the arm 39 tending to shorten and the arm 40 tending to lengthen. The effect of such adjustment of the arms 39 and 40 tends to move the tracing member 38 from the point A in a direction indicated by the arrow 100 in Fig. 5, and the amount of movement is proportional to the amount of rotation of the rotatable member 35 of the phase meter 31, one complete rotation, i.e., 360 degrees, thereof being effective to move the tracing element from one of the iso-phase lines shown in broken lines in Fig. 5 to the next adjacent iso-phase line of the same family. If the tracing and computing mechanism included only the arms 39 and 40 and the differential mechanism 49, that is if the arm 41 and its connection through the differential 48 to the motion transmitting means 43 were omitted, the tracing point 38 when driven through the differential 49 from the phase meter 31 would trace an elliptical path having the points 10 and 11 as foci, which elliptical path would intersect the hyperbolas shown in broken lines in Fig. 5 at right angles. However, the arm 41, as hereinafter described, is effective to convert this elliptical path to a hyperbolic path having foci at the points 11 and 12, this conversion being permitted by differential action of the differential 49.

Since the motion transmitting means 43 which is being driven by the differential 49 is connected through the bevel gear 90 to the shaft 88, the bevel gears 70 and 90 being in reverse relation, the shaft 88 will be driven in the direction indicated by the arrow in Fig. 1, and since the spider 79 and the shaft 78 of the differential 48 are held against reverse rotation by reason of the irreversible connection provided by the worm 76 and the worm gear 77, rotation of the differential pinion 82 through the gears 86 and 84 will effect rotation of the spider mounted pinions 80 and 81 so as to drive the spur gears 85 and 87 and consequently the shaft 89 in the direction indicated by the arrow, with the result that the arm 41 will be driven by the motion transmitting means 44 in a direction tending to lengthen the arm 41. Thus it will be observed that the arms 40 and 41, which are positively connected together through the differential 48, are simultaneously lengthened, and since the various gearing arrangements have equal ratios, the arms 40 and 41 will be lengthened the same amount. Consequently the movement of the tracing point 38 must follow a hyperbolic path, the focal points of the hyperbola being the points 11 and 12 of Fig. 5, which correspond to the locations of the motion transmitting means 43 and 44 in Fig. 1. The movement of the tracing element during the interval being considered may, therefore, be represented by the X marks 101 in Fig. 5, regardless of whether the mobile receiving unit 13 is moving along a true hyperbolic path with respect to the transmitting units 11 and 12 or not.

During the next interval of operation in which the transmitter at the unit 12 and the transmitter 20 at the unit 11 are operating to cause movement of the movable member 34 of the phase meter 30, the spider 79 of the differential 48 will be driven in a direction tending to lengthen the arm 41 and simultaneously shorten the arm 40. Since the arm 40 is being shortened, and since it is positively connected through the differential 49 to the arm 39, the arm 39 will be caused to correspondingly shorten as previously described in connection with the arms 40 and 41. Thus the tracing element 38, which is caused to move in the direction of the arrow 102 in Fig. 5 by the simultaneous shortening of the arm 40 and lengthening of the arm 41, will be caused to follow a hyperbolic path having the focal points 10 and 11 corresponding to the positions of the motion transmitting means 42 and 43 due to the simultaneous and equal shortening of the arms 39 and 40. The movable tracing point 38 thus follows the path indicated by the X marks 103 in Fig. 5, and during the next succeeding interval when the phase meter 30 is operating will progress to point B along the path indicated by the X marks 104.

It will thus be seen that by a series of alternate movements along hyperbolic paths of the two families respectively having focal points located at the positions 10, 11 and 12 corresponding to the locations of the transmitting units, the movable tracing point will be caused to follow the movement of the mobile receiving unit 13. The path represented by the X marks 101, 103 and 104 in Fig. 5 is greatly exaggerated insofar as the distance travelled during each alternate one-half second interval and in actual operation the tracing member 38 follows a close approximation of the actual path of the receiving unit 13. It will, of course, be understood that in systems such as those disclosed in the Honore Patent No. 2,148,267 and wherein the phase meters are simultaneously operated, the tracing point 38 will follow a continuous path which is a summation of the alternate hyperbolic paths referred to above.

The above described operation is typical of the operation of the computing and tracing equipment so long as the mobile receiving unit is operating within an area bounded by the lines joining the points D, E, F and the focal point 11 in Fig. 5, i. e., within the conjugate axes of the two hyperbolic families, since within this area movement of the tracing point along hyperbolic paths may always be accomplished by lengthening two of the arms 39, 40 and 41 and by correspondingly shortening one of the other arms. For movements outside of this area, however, it is necessary in some cases that all of the arms be lengthened simultaneously and this is automatically accomplished by reason of the operation of the differential mechanisms 48 and 49 and the arm 40. For example, if the tracing member 38 is at the point H in Fig. 5, it will be observed that movement of the tracing point in the direction of the arrow 105, for example, which would occur in response to rotating movement of the member 35 of the phase meter 31, requires that each of the arms 39, 40 and 41 be simultaneously lengthened. Since driving the differential 49 from the phase meter 31 tends to adjust the arms 39 and 40 in opposite directions, it is apparent that the sign of movement of one of the arms must be reversed in order to permit operation along hyperbolic paths from the point H. This is automatically accomplished by the differential mechanism 49 due to the fact that lengthening of the arms 40, for example, is effective through the irreversible differential 48 to lengthen the arm 41 and since lengthening of the arms 40 and 41 compels lengthening of the arm 39, the spider mounted pinions 59 and 60 of the differential mechanism 49 will thus be caused to rotate so as to drive the differential pinion 61 in a reverse direction, thereby reversing the normal movement of the arm 39 and causing it to lengthen simultaneously with the arms 40 and 41. Movement of the tracing point 38 in the direction of the arrows 106, 107 or 108 from the point H in Fig. 5 will likewise be accomplished in the manner heretofore described through operation of one or the other of the rotatable members 34 and 35, even though operation in the direction of the arrow 106 causes all of the arms to be simultaneously lengthened, and movement in the direction of the arrows 107 and 108 requires that all of the arms be simultaneously shortened, since in each case the differential mechanism which is being driven will be caused, by virtue of the fact that the spider of the other differential is held against reverse rotation, to reverse the normal sign of movement of one of the arms.

Operation of the computing mechanism 37 to plot a hyperbolic intersection grid or chart such, for example, as the chart shown in Fig. 5 may be effected merely by incorporating in the movable member 38 a suitable marking element such as a pen or stylus and then operating one of the differential mechanisms 48 or 49 to cause the member 38 to move along the desired hyperbolic paths or lanes while alternately operating the other differential mechanism to shift the member 38 from one desired lane or path to another. More specifically, in order to trace the family of hyperbolic curves shown in broken lines in Fig. 5, the tracing member 38 may be moved initially to the upper end of the hyperbolic path 110, for example, and the differential mechanism 48 may then be driven in the proper direction to cause the tracing element to move along the line 110 and draw the curve. On the completion of this operation the differential mechanism 48 is stopped and the differential mechanism 49 may then be rotated through one complete revolution, for example, to cause the tracing element to move from the completed line 110 to a position corresponding to the next lane or curve 111, whereupon the differential mechanism 48 may again be operated to trace this second curve. The family of hyperbolic curves shown in full lines in Fig. 5 may be similarly traced by operating the differential mechanism 49 to trace the curves and by operating the differential mechanism 48 to move the tracing element from one desired curve or lane to the next lane.

In the embodiment of the invention shown in Figs. 6 and 7, a pair of driving mechanisms 113 and 114, which may constitute either the phase meters 30 and 31 or the servo-motors 75 and 53 of Fig. 1, are connected by means of an irreversible connection (not shown) and a pair of shafts 115 and 116 to bevel gears 117 and 118 which respectively constitute portions of differential mechanisms 119 and 120. Also included in the differential mechanisms 119 and 120 are opposed pairs of bevel gears 121, 122 and 123, 124, respectively arranged to drive a plurality of shafts 125, 126, 127 and 128.

The shafts 127 and 128 which are driven by the differential 120 respectively terminate in motion transmitting means 129 and 130 which are similar to the motion transmitting means 42, for example, of Fig. 1, and which drivingly engage suitable rack teeth on a pair of extensible and retractable arms 131 and 132. Similarly the shafts 125 and 126 which are driven by the differential mechanism 119 are respectively connected to motion transmitting means 133 and 134, which drivingly engage extensible and retractable arm members 135 and 136. The motion transmitting means 129, 130, 133 and 134 are respectively located in positions corresponding to the focal points of a hyperbolic intersection grid, the motion transmitting means 129 and 134, which may, if desired, be superimposed on a single vertical axis, constituting the common focal point. Since the motion transmitting means 129 and 134 represent focal points of two separate sets of hyperbolas, it is not necessary that they be superimposed and it may be advantageous in special instances to employ, in radio position finding systems embodying the invention, a transmitter arrangement for producing two sets of hyperbolas with the central focal points separated a considerable distance. All of the arms 131, 132, 135 and 136 are pivotally connected at a common pivot point to a tracing member 137 which, as shown in Fig. 7, comprises a pivot pin 138 which rotatably carries a pair of gears 139 and 140, the arms 131 and 132 being adapted to mesh with the gear 139 and the arms 135 and 136 being arranged to mesh with the gear 140. It will be understood that suitable follower or guide means (not shown) are employed for maintaining all of the arms in meshing relation with the gears 139 and 140 and that similar means are employed at the various motion transmitting means both in this embodiment of the invention and in the previously described embodiment. With the above described arrangement it will be apparent that when the driving device 113, for example, is operated to rotate the differential gears 117, 121 and 122 so as to rotate the shafts 125 and 126 in the direction indicated by the small arrows, the motion transmitting means 133 and 134 respectively driven thereby will adjust the arms 135 and 136 so as effectively to lengthen the arm 135 while correspondingly shortening the arm 136. The consequent movement of the tracing member 137 will be generally downward and to the right from the position shown in Fig. 6, and since the arms 131 and 132 mesh with the same gear 139 on the pivot pin 138, relative movement of these arms is prevented and they will accordingly be adjusted so as simultaneously to shorten both the arms 131 and 132, thereby causing the tracing member 137 to move along the hyperbolic path represented by the line 140. The simultaneous shortening of the arms 131 and 132 is effective through the motion transmitting means 129 and 130 to drive the shafts 127 and 128 in the same direction, as indicated by the arrows, which, through the differential mechanism 120 cause the entire driving device 114, together with the shaft 116 and the gear 118 to rotate about the axis of the shafts 127 and 128, which is permitted due to the fact that the driving device 114 is mounted on a suitable slip ring structure 141 for bodily rotation about the shaft 128, the slip ring structure 141 being provided to effect the electrical connections to the driving device 114 while permitting the above described bodily movement thereof.

The line 140 along which the tracing member moves during the above described operation constitutes a hyperbolic path having its focal points at the positions occupied by the motion transmitting mechanism 130 and the motion transmitting mechanism 129. Upon operation of the driving device 114, the arms and the tracing point will be moved in a similar manner to cause the tracing member 137 to move along a hyperbolic path having as its focal points the locations of the motion transmitting means 133 and the motion transmitting means 134, the driving device 113 likewise being mounted on a slip ring structure 142 for rotation about the shaft 126 during the intervals that the driving device 114 is in operation.

The embodiment of the invention shown in Fig. 8 is in all respects similar to the embodiment of Fig. 1 except that the arm 40 of Fig. 1 has been omitted and corresponding parts are identified by the same reference numerals. Since the motion transmitting means 43 interconnects the shafts 68 and 88, it will be apparent that operation of either one of the servo-motors 53 or 75 will cause movement of both of the arms 39 and 41 so as to adjust the tracing member 38 exactly as in the embodiment of Fig. 1 so long as the tracing member 38 is operating within the area bounded by the lines 143 and 144. In this area lengthening of one of the arms will be accompanied by simultaneous shortening of the other arm in tracing hyperbolic paths, but omission of the arm 40 renders the computing and tracing apparatus incapable of reversing the sign of the movement of one of the arms as is required when tracing hyperbolic paths outside of this particular area as previously described in connection with the embodiment of Fig. 1.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. In a radio position finding system of the hyperbolic continuous wave type employing phase comparison in pairs of position indicating signals radiated from at least three spaced transmitting points to provide a pair of indications from which the position of a mobile receiving point relative to the known positions of the transmitting points may be determined, the combination of receiving apparatus at said mobile point including phase measuring means having a pair of indicator members rotatable to provide said indications, means including a chart providing representations of the known positions of said transmitting points relative to the area represented by said chart, and mechanical computing apparatus including a plurality of differential mechanisms having spiders driven by said indicator members and means adjustable on said chart with respect to said known positions and driven by said differential mechanisms in accordance with the rotation of said indicator members to indicate continuously on said chart the position of said receiving apparatus.

2. In a radio position finding system of the hyperbolic continuous wave type employing phase comparson in pairs of position indicating signals radiated from at least three spaced transmitting points to provide a pair of indications from which the position of a mobile receiving point relative to the known positions of the transmitting points may be determined, the combination of receiving apparatus at said mobile point including phase measuring means having a pair of indicator members rotatable to provide said indications, means including a chart providing representations of the known positions of said transmitting points relative to the area represented by said chart and constituting the focal points of a pair of intersecting families of hyperbolas, and mechanical computing apparatus including means movable over said chart having adjustable connections to at least two of said focal points and including a plurality of spider-driven differential mechanisms for adjusting said connections in accordance with the rotation of said indicator members, whereby the movement of said movable means over said chart continuously indicates the position of said receiving apparatus.

3. In a radio position finding system of the hyperbolic continuous wave type employing phase comparison in pairs of position indicating signals radiated from at least three spaced transmitting points to provide a pair of indications from which the position of a mobile receiving point relative to the known positions of the transmitting points may be determined, the combination of receiving apparatus at said mobile point including phase measuring means having a pair of indicator members rotatable to provide said indications, and mechanical computing apparatus comprising a plurality of motion transmitting means located in spaced apart relation representative of said three spaced transmission points, a movable member representative of the instantaneous positions of said receiving apparatus relative to said transmission points, a pair of extensible and retractable means pivotally connected to said movable member and respectively connected to the two most remotely spaced of said motion transmitting means, a pair of differential mechanisms respectively connected between the intermediate one of said motion transmitting means and the said two remotely spaced motion transmitting means, and irreversible means for respectively connecting said rotatable indicator members in driving relation to said differential mechanisms, whereby said movable member is moved to indicate continuously the position of said receiving apparatus.

4. In a radio position finding system of the hyperbolic continuous wave type employing phase comparison in pairs of position indicating signals radiated from at least three spaced transmitting points to provide a pair of indications from which the position of a mobile receiving point relative to the known positions of the transmitting points may be determined, the combination of receiving apparatus at said mobile point including phase measuring means having a pair of indicator members rotatable to provide said indications, and mechanical computing apparatus comprising a plurality of motion transmitting means located in spaced apart relation representative of said three spaced transmission points, a movable member representative of the instantaneous positions of said receiving apparatus relative to said transmission points, a pair of extensible and retractable means pivotally connected to said movable member and respectively connected to the two most remotely spaced of said motion transmitting means, a pair of differential mechanisms each having a pair of spider-mounted pinions and a pair of opposed differential pinions meshing with said spider-mounted pinions, irreversible means for respectively connecting said indicator members in driving relation to the spiders of said differentials, means respectively connecting one of said differential pinions of each of said differentials to said remotely spaced motion transmitting means, and means including the intermediate one of said motion transmitting means interconnecting the other differential pinions of said differential mechanisms whereby operation of either of said indicator members is effective to adjust both of said extensible and retractable means to move said movable member along hyperbolic paths the focal points of which depend upon which of said indicator members is being operated, thereby to indicate continuously the position of said receiving apparatus relative to said transmission points.

5. In a position determining system having a mobile receiving point, a pair of spaced transmitters continuously operative to radiate distinguishable position indicating signals, a transmitting unit spaced from each of said transmitters and including means for alternately radiating two other distinguishable position indicating signals, heterodyning receivers respectively associated with said transmitters and each jointly responsive to the position indicating signal radiated by the other transmitter and to a different one of the signals radiated by said transmitting unit for alternately modulating the signals radiated by said transmitters with reference signals having frequencies respectively equaling the difference frequencies of the heterodyned signals, a pair of receivers at said receiving point each operative to receive and reproduce a different one of said reference signals, said last-named receivers also being alternately operative to heterodyne the position indicating signals which have a difference frequency equaling the frequency of the reference signal being reproduced by the other receiver of said pair and to reproduce such difference frequency signal, whereby two pairs of signals of matching frequencies are alternately developed at said receiving point, phase measuring means at said receiving point for measuring the phase relationship between the signals of each pair and including a pair of members alternately rotatable in accordance with said phase relationship to provide two measures of the position of said receiving point relative to different ones of said transmitters, and a mechanical computing apparatus actuated by said alternately rotatable members and including a chart representative of an area blanketed by said transmitters and also including an element alternately driven over said chart along hyperbolic paths in accordance with the alternate rotation of said members to indicate continuously on said chart the position of said receiving point.

6. In a position determining system, a receiving point, a pair of spaced transmitters continuously operative to radiate distinguishable position indicating signals, a transmitting unit spaced from each of said transmitters and including means for alternately radiating two other distinguishable position indicating signals, heterodyning receivers respectively associated with said transmitters and each jointly responsive to the position indicating signal radiated by the other transmitter and to a different one of the signals radiated by said transmitting unit for alternately modulating the signals radiated by said transmitters with reference signals having frequencies respectively equaling the difference frequencies of the heterodyned signals, a pair of receivers at said receiving point each operative to receive and reproduce a different one of said reference signals, said last-named receivers also being alternately operative to heterodyne the position indicating signals which have a difference frequency equaling the frequency of the reference signal being reproduced by the other receiver of said pair and to reproduce such difference frequency signal, whereby two pairs of signals of matching frequencies are alternately developed at said receiving point, phase measuring means at said receiving point for measuring the phase relationship between the signals of each pair and including a pair of members alternately rotatable in accordance with said phase relationship to provide two measures of the position of said receiving point relative to different ones of said transmitters, and a mechanical computing apparatus actuated by said alternately rotatable members and including a chart representative of an area blanketed by said transmitters and means representative of the known positions of said spaced transmitters relative to said chart, motion transmitting means at said known chart positions, an indicating element movable over said chart and operatively connected to said motion transmitting means, differential mechanisms respectively driven by said rotatable members and respectively connected to said motion transmitting means, and means interconnecting said differential mechanisms whereby said indicating element is alternately driven along hyperbolic paths having as a focal point one or the other of said known chart positions, thereby to indicate continuously on said chart said position of said receiving apparatus.

7. In a position determining system having a mobile receiving point, a pair of spaced transmitters continuously operative to radiate distinguishable position indicating signals, a transmitting unit spaced from each of said transmitters and including means for alternately radiating two other distinguishable position indicating signals, heterodyning receivers respectively associated with said transmitters and each jointly responsive to the position indicating signal radiated by the other transmitter and to a different one of the signals radiated by said transmitting unit for alternately modulating the signals radiated by said transmitters with reference signals having frequencies respectively equaling the difference frequencies of the heterodyned signals, a pair of receivers at said receiving point each operative to receive and reproduce a different one of said reference signals, said last-named receivers also being alternately operative to heterodyne the position indicating signals which have a difference frequency equaling the frequency of the reference signal being reproduced by the other receiver of said pair and to reproduce such difference frequency signal, whereby two pairs of signals of matching frequencies are alternately developed at said receiving point, phase measuring means at said receiving point for measuring the phase relationship between the signals of each pair and including a pair of members alternately rotatable to provide two measures of the position of said receiving point relative to different ones of said transmitters, and a mechanical computing apparatus including a chart representative of an area blanketed by said transmitters and means representative of the known positions of said spaced transmitters relative to said chart, motion transmitting means at each of said known chart positions, a movable tracing member, a pair of extensible and retractable means pivotally connected to said tracing member and respectively connected to said motion transmitting means, a pair of differential mechanisms each having a pair of spider-mounted pinions and a pair of opposed differential pinions meshing with said spider-mounted pinions, irreversible means for respectively connecting said rotatable members in driving relation to the spiders of said differentials, means respectively connecting one of said differential pinions of each of said differentials to said motion transmitting means at said spaced transmitter positions, and means interconnecting the other differential pinions of said differential mechanisms whereby alternate operation of said rotatable members is effective through said differentials to move said tracing member along hyperbolic paths having focal points which correspond to the positions of said transmitters thereby to indicate continuously on said chart the position of said receiving apparatus.

8. Wave signal receiving and position tracing apparatus for translating received space radiated waves from at least three spaced transmission points and continuously tracing the position of the receiving apparatus on a hyperbolic grid having focal points corresponding to the positions of said transmitting points, one of the focal points being common to the two families of hyperbola forming said grid, comprising wave signal receiving means responsive to said received waves in pairs for producing two pairs of signals, the signals of each pair having a phase relationship representative of the position of said receiving apparatus relative to said transmission points, phase measuring means energizeable by said pairs of signals and including a pair of elements respectively rotatable to positions indicative of said phase relationships, motion transmitting means at said focal points, a movable tracing member, a pair of extensible and retractable means pivotally connected to said tracing member and respectively connected to said motion transmitting means at the two focal points other than said common focal point, differential mechanisms respectively connected between said motion transmitting means at said common focal point and said motion transmitting means at said two other focal points, and irreversible means for respectively driving said differential mechanisms from said rotatable elements of said phase measuring means.

9. Wave signal receiving and position tracing apparatus for translating received space radiated waves from at least three spaced transmission points and continuously tracing the position of the receiving apparatus on a hyperbolic grid having focal points corresponding to the positions of said transmitting points, one of the focal points being common to the two families of hyperbola forming said grid, comprising wave signal receiving means responsive to said received waves in pairs for producing two pairs of signals, the signals of each pair having a phase relationship representative of the position of said receiving apparatus relative to said transmission points, phase measuring means energizeable by said pairs of signals and including a pair of elements respectively rotatable to positions indicative of said phase relationships, motion transmitting means at said focal points, a movable tracing member, a pair of extensible and retractable means pivotally connected to said tracing member and respectively connected to said motion transmitting means at the two focal points other than said common focal point, a pair of differential mechanisms each having a pair of spider-mounted pinions and a pair of opposed differential pinions meshing with said spider-mounted pinions, means including an irreversible connection for respectively driving the spiders of said differential mechanisms from said rotatable elements of said phase measuring means, means respectively connecting one of said differential pinions of each of said differential mechanisms to said motion transmitting means at said two other focal points, and means including said motion transmitting means at said common focal point interconnecting the other differential pinions of said differential mechanisms, whereby rotation of either of said rotatable elements is effective to adjust said extensible and retractable means to move said tracing member along hyperbolic paths.

10. Wave signal receiving apparatus for translating received space radiated waves into position indications, comprising a receiver operating to receive a first pair of space radiated waves and to heterodyne said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver operative to receive and heterodyne said second pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, phase measuring means alternately excited by said signals in pairs and including a pair of members alternately rotatable in accordance with the phase relationship between said first heterodyne and second reference signals and between said second heterodyne and first reference signals to provide two measures of the position of said receiving apparatus relative to two displaced sources of said waves, and a mechanical computing apparatus including a chart representative of an area blanketed by said waves and also including an element alternately driven along hyperbolic paths in accordance with the rotation of said members to indicate continuously on said chart said position of said receiving apparatus.

11. Wave signal receiving apparatus for translating received space radiated waves into position indications, comprising a receiver operating to receive a first pair of space radiated waves and to heterodyne said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver operative to receive and heterodyne said second pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, phase measuring means alternately excited by said signals in pairs and including a pair of members alternately rotatable in accordance with the phase relationship between said first heterodyne and second reference signals and between said second heterodyne and first reference signals to provide two measures of the position of said receiving apparatus relative to two displaced sources of said waves, and a mechanical computing apparatus including a chart representative of an area blanketed by said waves and also including means representative of the position of said two displaced sources of said waves relative to said chart area, motion transmitting means at said two positions, an indicating element movable over said chart and operatively connected to said motion transmitting means, differential mechanisms connected to each of said motion transmitting means and driven by said rotatable members, and means including a reversing gear interconnecting said differential mechanisms, whereby said indicating element is alternately driven along hyperbolic paths to indicate continuously on said chart said position of said receiving apparatus.

12. Apparatus for tracing, on a hyperbolic grid formed by an intersecting pair of families of hyperbolas having a common focal point, the position of an object the movements of which relative to said families are reflected by the rotation of a pair of driving elements; comprising motion transmitting means positioned at said common focal point and at the second focal point of each of said families; a movable tracing member; a pair of extensible and retractable means pivotally connected to said tracing member and respectively connected to said motion transmitting means at said second focal points; differential mechanisms respectively connected between said motion transmitting means at said common focal point and said motion transmitting means at said second focal points; and irreversible means for respectively driving said differential mechanisms from said driving elements.

13. Apparatus for tracing, on a hyperbolic grid formed by an intersecting pair of families of hyperbolas having a common focal point, the position of an object the movements of which relative to said families are reflected by the rotation of a pair of driving elements; comprising motion transmitting means positioned on said grid at said common focal point and at the second focal point of each of said families, a movable tracing member, a pair of extensible and retractable means pivotally connected to said tracing member and respectively connected to said motion transmitting means at said second focal points, a pair of differential mechanisms each having a pair of spider-mounted pinions and a pair of opposed differential pinions meshing with said spider-mounted pinions, irreversible means for respectively driving the spiders of said differential mechanisms from said driving elements, means respectively connecting one of said differential pinions of each of said differentials to said motion transmitting means at said second focal points, and means including said motion transmitting means at said common focal point interconnecting the other differential pinions of said differential mechanisms whereby operation of either of said driving elements is effective to adjust both of said extensible and retractable means to move said tracing member along hyperbolic paths the focal points of which depend upon which of said driving elements is being operated.

14. Apparatus for plotting an intersecting pair of families of hyperbolic curves having a common focal point and having the second focal points of said families in spaced relation to each other, comprising motion transmitting means at each of said focal points, a movable tracing member, a pair of extensible and retractable means pivotally connected to said tracing member and respectively connected to said motion transmitting means at said second focal points, differential mechanisms respectively connected between said motion transmitting means at said common focal point and said motion transmitting means at said second focal points, and irreversible means for independently driving said differential mechanisms.

15. Apparatus for plotting an intersecting pair of families of hyperbolic curves having a common focal point and having the second focal points of said families in spaced relation to each other, comprising motion transmitting means at each of said focal points, a movable tracing member, a pair of extensible and retractable means pivotally connected to said tracing member and respectively connected to said motion transmitting means at said second focal points, a pair of differential mechanisms each having a pair of spider-mounted pinions and a pair of opposed differential pinions meshing with said spider-mounted pinions, driving means including an irreversible connection for driving the spiders of said differentials, means respectively connecting one of said differential pinions of each of said differentials to said motion transmitting means at said second focal points, and means including said motion transmitting means at said common focal point interconnecting the other differential pinions of said differential mechanisms whereby operation of either of said driving means is effective to adjust both of said extensible and retractable means to move said tracing member along hyperbolic paths the focal points of which depend upon which of said driving means is being operated.

16. Apparatus for plotting an intersecting pair of families of hyperbolic curves having a common focal point and having the second focal points of said families in spaced relation to each other, comprising motion transmitting means at each of said focal points, a movable tracing member, extensible and retractable means pivotally connected to said tracing member and respectively connected to said motion transmitting means, differential mechanisms respectively connected between said motion transmitting means at said common focal point and said motion transmitting means at said second focal points, and irreversible means for independently driving said differential mechanisms, whereby operation of one of said driving means is effective to plot hyperbolic curves in one of said families and to adjust said tracing member from one curve to another in the other of said families and operation of the other of said driving means is effective to plot hyperbolic curves in said other family and to adjust said tracing member between curves in said one family.

17. Apparatus for plotting an intersecting pair of families of hyperbolic curves having a common focal point and having the second focal points of said families in spaced relation to each other, comprising motion transmitting means at each of said focal points, a movable tracing member, extensible and retractable means pivotally connected to said tracing member and respectively connected to said motion transmitting means, a pair of differential mechanisms each having a pair of spider-mounted pinions and a pair of opposed differential pinions meshing with said spider-mounted pinions, driving means including an irreversible connection for driving the spiders of said differentials, means respectively connecting one of said differential pinions of each of said differentials to said motion transmitting means at said second focal points, and means including said motion transmitting means at said common focal point interconnecting the other differential pinions of said differential mechanisms whereby operation of either of said driving means is effective to adjust all of said extensible and retractable means to move said tracing member along hyperbolic paths the focal points of which depend upon which of said driving means is being operated.

18. Apparatus for tracing, on a hyperbolic grid formed by an intersecting pair of families of hyperbolas having a common focal point, the position of an object the movements of which relative to said families are reflected by the rotation of a pair of driving elements; comprising motion transmitting means positioned at said common focal point and at the second focal point of each of said families; a movable tracing member; extensible and retractable means pivotally connected to said tracing member and respectively connected to said motion transmitting means at said focal points; differential mechanisms respectively connected between said motion transmitting means at said common focal point and said motion transmitting means at said second focal points; and irreversible means for respectively driving said differential mechanisms from said driving elements.

19. Apparatus for tracing, on a hyperbolic grid formed by an intersecting pair of families of hyperbolas having a common focal point, the position of an object the movements of which relative to said families are reflected by the rotation of a pair of driving elements; comprising motion transmitting means positioned on said grid at said common focal point and at the second focal point of each of said families, a movable tracing member, extensible and retractable means pivotally connected to said tracing member and respectively connected to said motion transmitting means at said focal points, a pair of differential mechanisms each having a pair of spider-mounted pinions and a pair of opposed differential pinions meshing with said spider-mounted pinions, irreversible means for respectively driving the spiders of said differential mechanisms from said driving elements, means respectively connecting one of said differential pinions of each of said differentials to said motion transmitting means at said second focal points, and means including said motion transmitting means at said common focal point interconnecting the other differential pinions of said differential mechanisms whereby operation of either of said driving elements is effective to adjust all of said extensible and retractable means to move said tracing member along hyperbolic paths the focal points of which depend upon which of said driving elements is being operated.

20. Apparatus for plotting an intersecting pair of families of hyperbolic curves having a common focal point and having the second focal points of said families in spaced relation to each other, comprising motion transmitting means at each of said focal points, a movable tracing member, extensible and retractable means pivotally connected to said tracing member and respectively connected to said motion transmitting means at said focal points, differential mechanisms respectively connected between said motion transmitting means at said common focal point and said motion transmitting means at said second focal points, and irreversible means for independently driving said differential mechanisms.

21. Apparatus for plotting an intersecting pair of families of hyperbolic curves having a common focal point and having the second focal points of said families in spaced relation to each other, comprising motion transmitting means at each of said focal points, a movable tracing member, three extensible and retractable means pivotally connected to said tracing member and respectively connected to said motion transmitting means at said focal points, a pair of differential mechanisms each having a pair of spider-mounted pinions and a pair of opposed differential pinions meshing with said spider-mounted pinions, driving means including an irreversible connection for driving the spiders of said differentials, means respectively connecting one of said differential pinions of each of said differentials to said motion transmitting means at said second focal points, and means including said motion transmitting means at said common focal point interconnecting the other differential pinions of said differential mechanisms whereby operation of either of said driving means is effective to adjust all of said extensible and retractable means to move said tracing member along hyperbolic paths the focal points of which depend upon which of said driving means is being operated.

22. In a radio position finding system of the hyperbolic continuous wave type employing phase comparision in pairs of position indicating signals radiated from at least three spaced transmitting points to provide a pair of indications from which the position of a mobile receiving point relative to the known positions of the transmitting points may be determined, the combination of receiving apparatus at said mobile point including phase measuring means having a pair of indicator members rotatable to provide said indications, a plurality of differential mechanisms having spiders driven by said indicator members, and mechanical computing apparatus including cooperating relatively movable chart means and position indicating means, said chart means providing representations of the known positions of said transmitting points relative to the area represented by said chart, and means driven by said differential mechanisms in accordance with the rotation of said indicator members for causing relative movement between said chart means and said indicating means to indicate continuously on said chart the position of said receiving apparatus.

23. In a position determining system having a mobile receiving point, a pair of spaced transmitters continuously operative to radiate distinguishable position indicating signals, a transmitting unit spaced from each of said transmitters and including means for alternately radiating two other distinguishable position indicating signals, heterodyning receivers respectively associated with said transmitters and each jointly responsive to the position indicating signal radiated by the other transmitter and to a different one of the signals radiated by said transmitting unit for alternately modulating the signals radiated by said transmitters with reference signals having frequencies respectively equaling the difference frequencies of the heterodyned signals, a pair of receivers at said receiving point each operative to receive and reproduce a different one of said reference signals, said last-named receivers also being alternately operative to heterodyne the position indicating signals which have a difference frequency equaling the frequency of the reference signal being reproduced by the other receiver of said pair and to reproduce such difference frequency signal, whereby two pairs of signals of matching frequencies are alternately developed at said receiving point, phase measuring means at said receiving point for measuring the phase relationship between the signals of each pair and including a pair of members alternately rotatable in accordance with said phase relationship to provide two measures of the position of said receiving point relative to different ones of said transmitters, a mechanical computing apparatus actuated by said alternately rotatable members and including cooperating relatively movable chart means and indicating means, said chart means being representative of an area blanketed by said transmitters, and means for causing relative movement between said chart means and said indicating means whereby said indicating means effectively moves along hyperbolic paths over said chart in accordance with the alternate rotation of said members to indicate continuously on said chart the position of said receiving point.

24. Wave signal receiving apparatus for translating received space radiated waves into position indications, comprising a receiver operating to receive a first pair of space radiated waves and to heterodyne said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver operative to receive and heterodyne said second pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, phase measuring means alternately excited by said signals in pairs and including a pair of members alternately rotatable in accordance with the phase relationship between said first heterodyne and second reference signals and between said second heterodyne and first reference signals to provide two measures of the position of said receiving apparatus relative to two displaced sources of said waves, a mechanical computing apparatus including cooperating relatively movable chart means and indicating means, said chart means being representative of an area blanketed by said waves, and means for causing relative movement between said chart means and said indicating means whereby said indicating means effectively moves along hyperbolic paths over said chart in accordance with the alternate rotation of said members to indicate continuously on said chart the position of said receiving apparatus.

JAMES E. HAWKINS.
ROBERT W. BALTOSSER.

REFERENCES CITED

The following references are of record in the file of this patent:

UNITED STATES PATENTS

| Number | Name | Date |
|---|---|---|
| 1,942,262 | Shanklin | Jan. 2, 1934 |
| 2,408,773 | Goodall | Oct. 8, 1946 |
| 2,422,025 | Luck | June 10, 1947 |
| 2,493,786 | Swift | Jan. 10, 1950 |